United States Patent
Bak (10) Patent No.: US 11,213,163 B2
(45) Date of Patent: Jan. 4, 2022

(54) HEATING MAGNETIC BODY FOR COOKING CONTAINER FOR AN INDUCTION RANGE

(71) Applicant: SUN HOUSE CO., LTD., Gyeongsangnam-do (KR)

(72) Inventor: Haewon Bak, Gyeongsangnam-do (KR)

(73) Assignee: SUN HOUSE CO., LTD., Gyeongsangnam-do (KR)

( * ) Notice: Subject to any disclaimer, the term of this patent is extended or adjusted under 35 U.S.C. 154(b) by 240 days.

(21) Appl. No.: 16/488,054

(22) PCT Filed: Feb. 12, 2018

(86) PCT No.: PCT/KR2018/001849
§ 371 (c)(1),
(2) Date: Aug. 22, 2019

(87) PCT Pub. No.: WO2018/199448
PCT Pub. Date: Nov. 1, 2018

(65) Prior Publication Data
US 2020/0138237 A1    May 7, 2020

(30) Foreign Application Priority Data
Apr. 27, 2017 (KR) .................. 10-2017-0054643

(51) Int. Cl.
*A47J 36/02* (2006.01)
*A47J 27/00* (2006.01)

(52) U.S. Cl.
CPC ............ *A47J 36/02* (2013.01); *A47J 27/002* (2013.01)

(58) Field of Classification Search
CPC ........... A47J 36/02; A47J 27/002; H05B 6/12; H05B 6/1209; H05B 6/105; H05B 6/106
See application file for complete search history.

(56) References Cited

FOREIGN PATENT DOCUMENTS

| CN | 203555525 | 4/2014 | |
|---|---|---|---|
| KR | 20010010381 | 2/2001 | |
| KR | 20020095799 | 12/2002 | |
| KR | 20030090585 | 11/2003 | |
| KR | 20040038486 | 5/2004 | |
| KR | 100024630 | 3/2010 | |
| KR | 20100024630 | 3/2010 | |
| KR | 20100024630 A * | 3/2010 | |
| WO | WO-2006056632 A2 * | 6/2006 | ............... A47J 36/02 |

* cited by examiner

*Primary Examiner* — John J Norton
(74) *Attorney, Agent, or Firm* — IPLA P.A.

(57) ABSTRACT

A heating magnetic body for a cooking container for an induction range includes a base plate having a bottom exposed to the bottom of a cooking container and elastic support parts, each part having both ends face each other in the base plate and cut off so that the center of each part is upward protruded and both ends being upward bent in such a way as to be connected to the base plate and having a center downward inclined and curved toward both ends, wherein if the cooking container is formed in a mold, when an upper mold corresponding to a lower mold in which the base plate is seated is pressurized, the elastic support parts come into contact with the bottom of the upper mold simultaneously and are elastically supported to reach a top of the bottom of the upper mold B1 after the cooking container is formed.

2 Claims, 6 Drawing Sheets

HEATING MAGNETIC BODY FOR COOKING CONTAINER FOR AN INDUCTION RANGE

BACKGROUND

The present invention relates to a heating magnetic body for a cooking container for an induction range and, more particularly, to a heating magnetic body for a cooking container for an induction range, wherein a magnetic material that generates heat in response to the magnetic field of an induction range according to a high frequency induction heating method can be disposed at the bottom of a cooking container more solidly and precisely in such a way as to be matched with a mold when the cooking container is fabricated.

In general, an induction range is one of electric ranges using electricity as a heating source. The demand for the induction range is recently suddenly increased due to advantages of no oxygen consumption, no discharge of waste gas, and high energy efficiency and stability.

When a high frequency current is supplied to a coil, an AC magnetic current is generated from the coil, an eddy current is generated from a magnetic body, and heat is generated from the magnetic body according to Joule's heat of the eddy current. A cooking container made of non-magnetic metal, such as an aluminum alloy, cannot be used in the induction range. Accordingly, magnetic metal must be attached to the bottom of a common heating container made of a non-magnetic metal material so that the heating container generates heat in response to an AC magnetic current generated from the coil of the induction range.

To this end, in a conventional technology, as disclosed in Korean Patent Application Publication No. 10-0038486 (May 8, 2004), there is a technology in which a conductive plate (i.e., magnetic body) is directly attached to the bottom of the main body of a cooking container made of an aluminum alloy. As disclosed in Korean Patent Application Publication No. 10-0090585 (Nov. 28, 2003), there is a technology in which a magnetic plate, a non-magnetic plate and a magnetic plate are sequentially stacked on the bottom of the body of a kitchen container fabricated by die-casting through high frequency thermosetting. However, if the magnetic body is attached to the bottom of the container made of an aluminum alloy in a sheet form as described above, when heat of a high temperature is generated from the magnetic body of the induction range, there is a problem in that a phenomenon in which the bottom of the container is inward bulged is generated because the bottom of the container made of an aluminum alloy and the elongation of the magnetic plate are different or in that the bottom of the container and the magnetic plate is twisted and separated.

In order to overcome such problems, as disclosed in Korean Patent Application Publication No. 10-0095799 (Dec. 28, 2002), there is a technology in which after protrusions and holes (or grooves) that are press-fitted each other are formed at locations where the main body of a container made of aluminum and a stainless plate of a conductor correspond to each other, they are stacked and pressurized. As disclosed in Korean Patent Application Publication No. 10-0010381 (Feb. 5, 2001), there is a technology in which a plurality of holes in which a plurality of cut-off parts and trapping means have been formed is perforated into a metal heating plate of a conductor, the metal heating plate is located in a mold, and aluminum pouring is pressurized and coagulated so that the metal heating plate is integrated with an aluminum alloy, wherein a peel-off prevention jaw is configured in the hole of the heating plate, that is, a conductor. In Korean Patent Application Publication No. 10-0095799, although the protrusions and the holes are formed in the container and the conductor or the holes are slantly formed, the conductor is easily detached from the container when the heating container is frequently heated and used or the phenomenon in which the container is inward bulged from the bottom of the container cannot be prevented from occurring. In Korean Patent Application Publication No. 10-0010381, although the plurality of cut-off parts and holes for reducing thermal expansion of the heating plate, that is, a conductor, are perforated, the bulging phenomenon toward the inside of the bottom of the container made of an aluminum alloy having high elongation is generated because the inside and outside of the bottom of the container have different elongations due to different materials. Furthermore, separation cannot be fully prevented.

Figure 7:
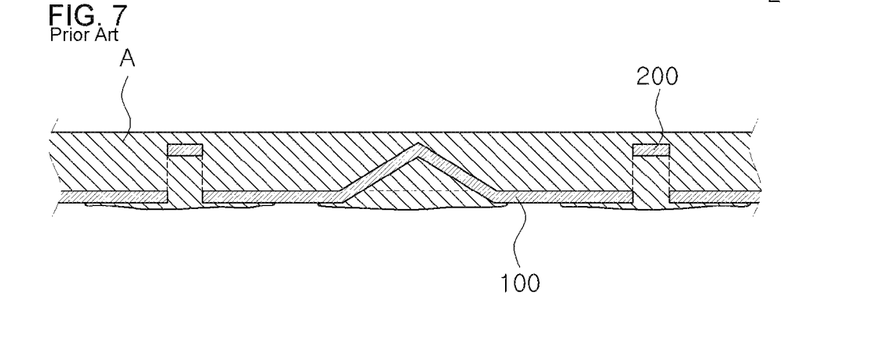
FIG. 7 is a cross-sectional view showing a failure state generated when a cooking container is fabricated using a conductive plate in Korean Patent Application Publication No. 2010-0034630.

In order to solve such problems, as disclosed in Korean Patent Application Publication No. 10-0024630 (Mar. 8, 2010), there is a technology in which a conductive plate is equipped with a trapping member 200 capable of being closely coupled to an induction container. Such a technology has an effect in that the induction container and the conductive plate can be coupled more closely, but has problems in that the conductive plate is merely located at the bottom of the container, the conductive plate is not pressurized and fixed between the upper mold and lower mold of a mold when the induction container is pressurized and formed by the upper mold and lower mold, and thus the molten matter of the induction container is bulged to the bottom of the conductive plate 100 as shown in FIG. 7.

SUMMARY OF THE INVENTION

The present invention has been made to solve the above problems occurring in the prior art and an object of the present invention is to significantly improve durability by increasing a coupling force between a heating magnetic body and a cooking container in such a manner that the heating magnetic body made of a magnetic material and adapted to autonomously generate heat in response to an eddy current generated in response to an AC magnetic current generated from the coil of an induction range is coupled to the bottom of the cooking container made of a non-magnetic material so that the bottom of the heating magnetic body is exposed and to minimize a phenomenon in which the molten matter of the cooking container is bulged to the bottom of the heating magnetic body in such a manner that the heating magnetic body is elastically supported between the upper mold and lower mold of a mold when the cooking container for the induction range is fabricated using the mold or to minimize a manufacturing error rate of the cooking container for the induction range by overcoming problems, such as a bulging phenomenon toward the upper part of the bottom of the container.

Furthermore, an object of the present invention is to further reduce error rate by minimizing that the top of elastic support parts is exposed over the bottom of the cooking container after the cooking container is formed although the elastic support parts of the heating magnetic body that elastically support the upper mold of the mold are exposed to the upper part of the bottom of the cooking container.

Technical Solution

An embodiment of the present invention provides a heating magnetic body for a cooking container for an induction range, including a base plate made of a magnetic material and having a bottom exposed to the bottom of a cooking container made of a non-magnetic material and a plurality of elastic support parts, each part having both ends face each other in the base plate and cut off so that the center of each part is upward protruded and both ends being upward bent in such a way as to be connected to the base plate and having a center downward inclined and curved toward both ends, wherein if the cooking container is formed in a mold, when an upper mold corresponding to a lower mold in which the base plate is seated is pressurized, the elastic support parts come into contact with the bottom of the upper mold simultaneously and are elastically supported to reach a top of the bottom of the upper mold after the cooking container is formed. The elastic support part includes a cutting edge contact part having the center pointed in such a way as to come into contact with the bottom of the upper mold.

In this case, the elastic support part may include prop parts, each part being formed to have a specific width "t" in a specific interval "l", at both ends connected to the base plate and partial narrow parts, each part being formed to have a width gradually narrowed from the upper part of the prop part on each side to the cutting edge contact part at the center or full narrow parts formed to have widths gradually narrowed from both ends connected to the base plate to the cutting edge contact part at the center.

In the heating magnetic body for a cooking container for an induction range according to an embodiment of the present invention, when the bottom of the cooking container for an induction range is pressurized and formed by the upper mold and the lower mold, the top of the elastic support parts formed in the heating magnetic body seated in the lower mold in such a way as to be upward protruded is elastically supported by the upper mold, and thus the heating magnetic body is elastically supported between the upper mold and the lower mold. Accordingly, an error rate is minimized because the aluminum alloy molten matter of the cooking container made of a non-magnetic material is not bulged to the bottom of the heating magnetic body. In this case, although the elastic support parts of the heating magnetic body elastically supporting the upper mold of the mold are protruded to the upper part of the bottom of the cooking container, the top of the elastic support parts is exposed to the upper part of the bottom of the cooking container to a minimum extent after the cooking container is formed. Accordingly, there is an effect in that an error rate can be further reduced.

The upper mold uniformly pressurizes the aluminum alloy at the bottom of the cooking container by the plurality of elastic support parts uniformly protruded upward from the heating magnetic body. Accordingly, the cooking container can be precisely fabricated so that a surface of the bottom of the cooking container is uniformly formed and thus the bottom of the cooking container for the induction range has a uniform thickness. As a result, the forming precision of a bottom part that is most important in the cooking container for the induction range can be improved.

Furthermore, the aluminum alloy molten matter of the cooking container is uniformly introduced between the elastic support parts of the heating magnetic body. After the aluminum alloy molten matter is hardened through the through boles, the heating magnetic body and the bottom of the container are coupled more strongly, thereby increasing a coupling force. Accordingly, although the cooking container made of a non-magnetic material and having high elongation and the heating magnetic body made of a magnetic material and having low elongation are coupled, a bulging phenomenon at the bottom of the container can be prevented. As a result, although the cooking container is used for a long period of time, an error rate can be further reduced and lifespan can be further increased because the cooking container is rarely deformed. Furthermore, durability of the cooking container for the induction range can be significantly improved by the improved coupling force between the heating magnetic body and the cooking container.

Furthermore, fabrication is very easy and a manufacturing cost can be significantly reduced through a simple structure in which the through boles and the elastic support parts are formed in the base plate. The lower part to upper part of the bottom of the cooking container is connected by the elastic support parts, and the bottom of the base plate of the heating magnetic body is exposed at the bottom of the cooking container. Accordingly, there is an effect in that high frequency induction heating can be performed more smoothly because the heating magnetic body directly receives an AC magnetic current generated from the coil of the induction range.

DETAILED DESCRIPTION OF THE INVENTION

An embodiment of the present invention provides a heating magnetic body for a cooking container for an induction range, wherein a magnetic material that generates heat in response to the magnetic field of an induction range according to a high frequency induction heating method can be disposed at the bottom of a cooking container more solidly and precisely in such a way as to be matched with a mold when the cooking container is fabricated. The heating magnetic body is described in more detail below with reference to the accompanying drawings.

Figure 1:
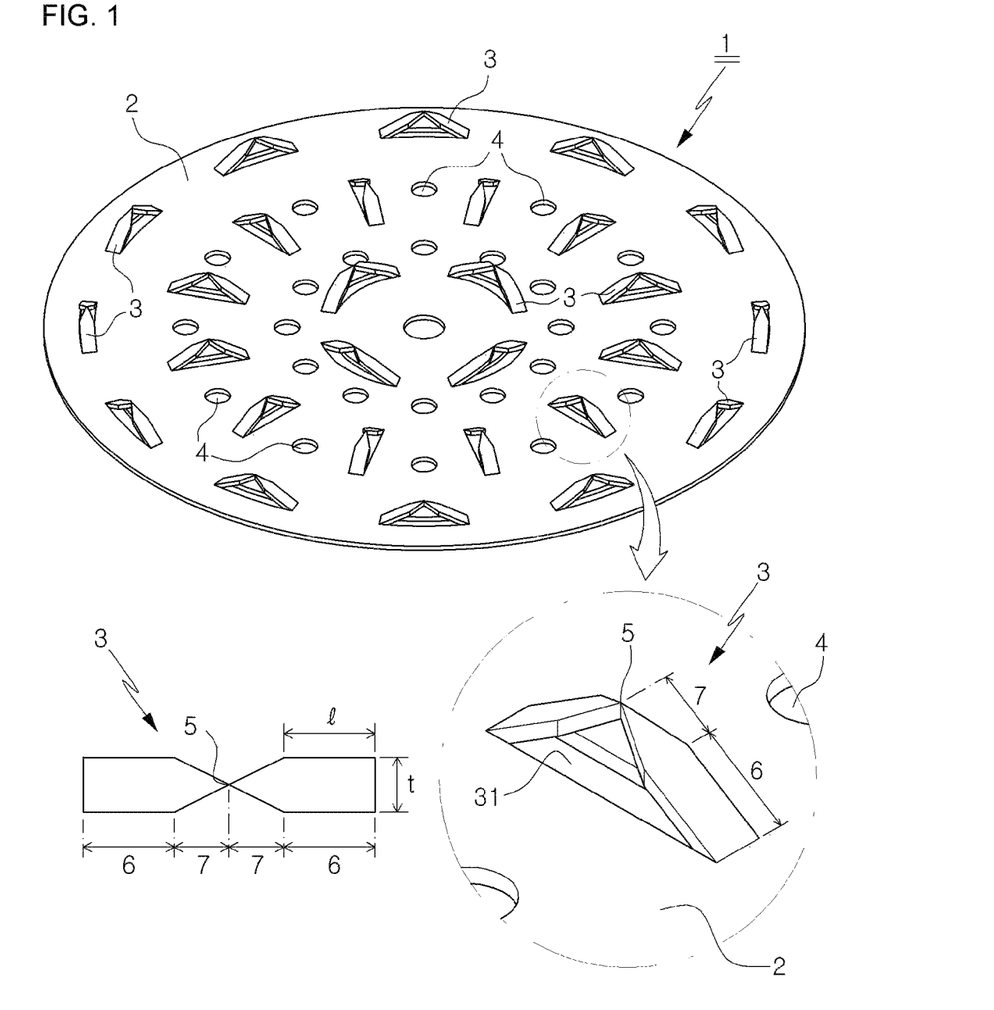
FIG. 1 is a stereographical diagram showing a first practical example of a heating magnetic body provided according to an embodiment of the present invention.
Figure 2:
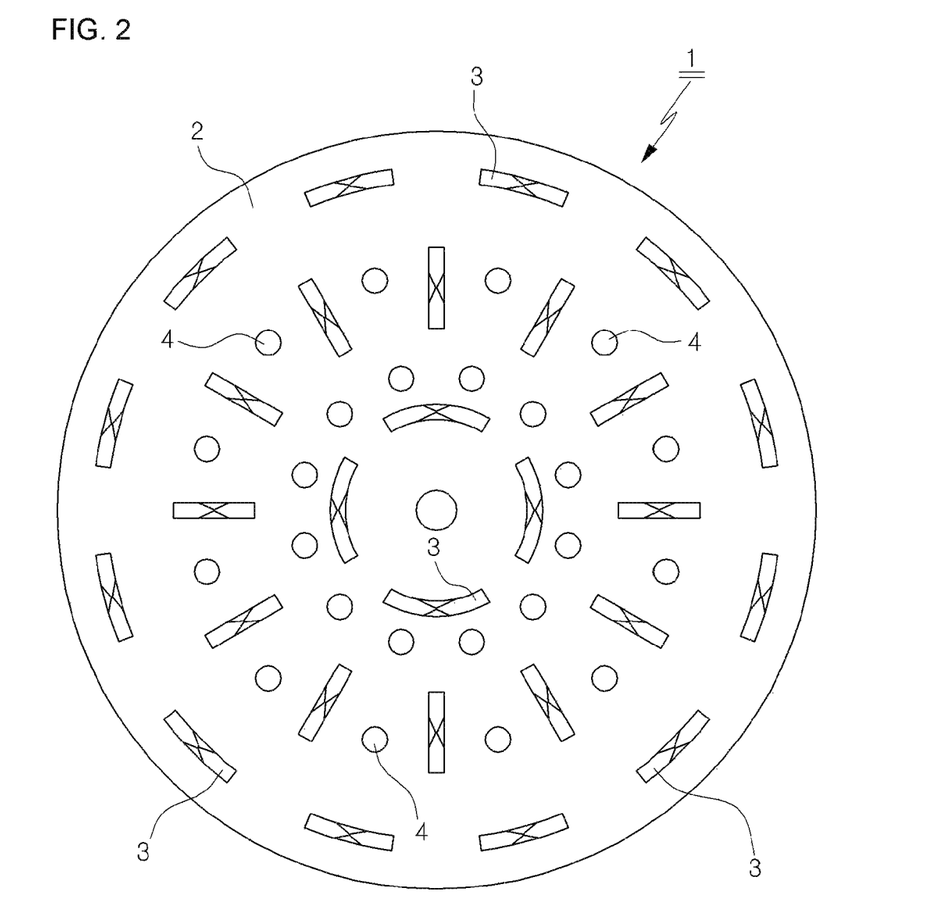
FIG. 2 is a plan view of the heating magnetic body shown in FIG. 1.

As shown in a stereoscopic view of FIG. 1 and a plan view of FIG. 2, a first practical example, the heating magnetic body 1 of a cooking container A for an induction range according to the present invention basically includes a circular base plate 2 and a plurality of elastic support parts 3 upward protruded from the base plate 2. A plurality of through boles 4 is formed in the base plate 2 in such a way as to perforate the base plate up and down.

Figure 3:
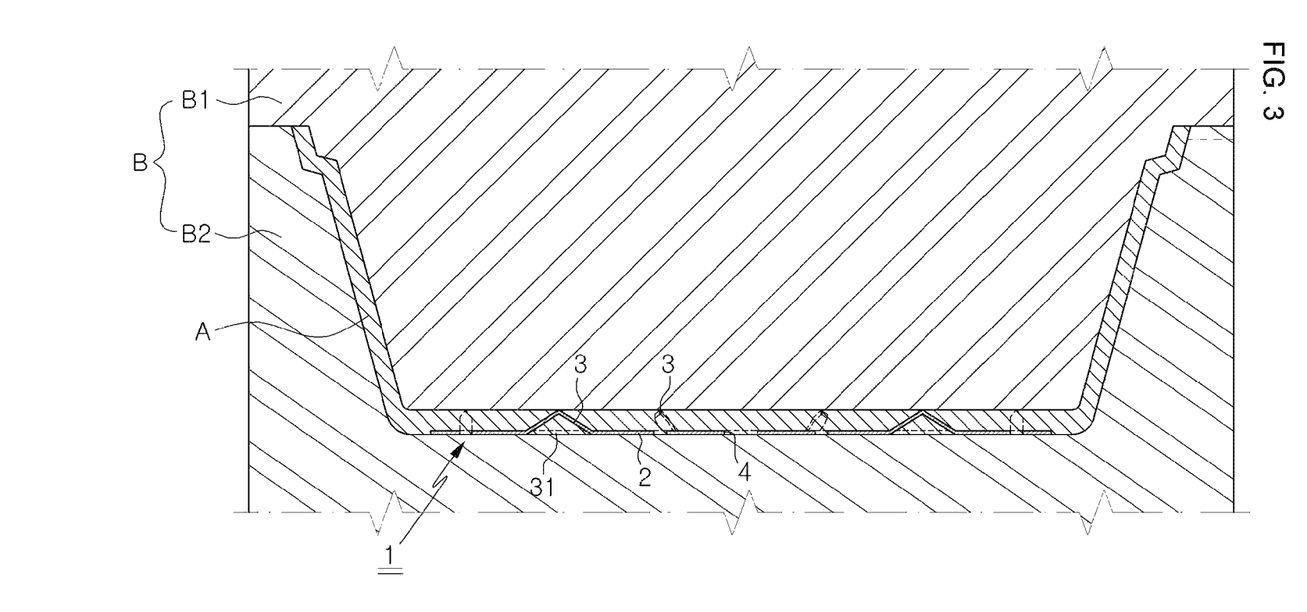
FIG. 3 is a cross-sectional view showing the state in which a cooking container for an induction range is fabricated in a mold using the heating magnetic body of FIGS. 1 and 2.

As shown in FIGS. 2 and 3, the bottom of the cooking container A for an induction range made of a non-magnetic material, such as an aluminum alloy, is coupled to the bottom of the heating magnetic body 1 in such a way as to be exposed. The heating magnetic body 1 is made of a magnetic material, such as stainless steel chiefly including iron or STS 400-series iron. The heating magnetic body 1 generates an eddy current in response to an AC magnetic current generated from a coil disposed within the induction range, generates heat of a high temperature according to Joule's heat, and provides heat to the cooking container A. Accordingly, cooking is performed within the cooking container A.

Figure 4:
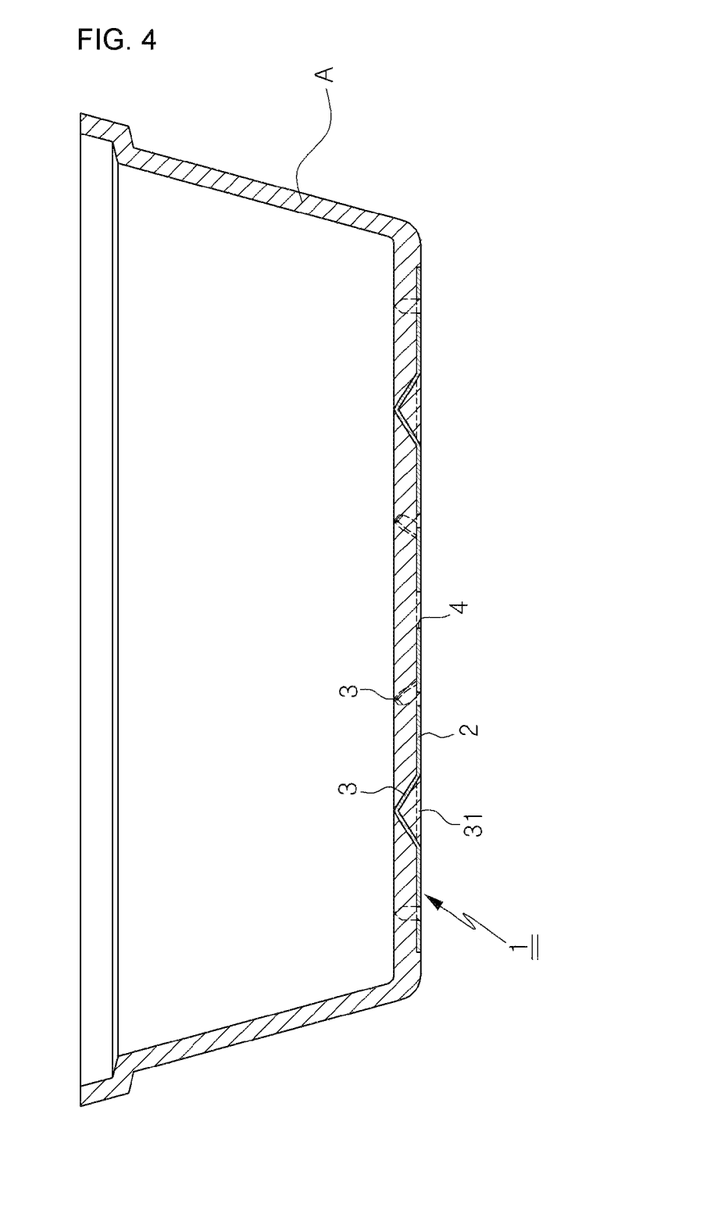
FIG. 4 is a cross-sectional view of the cooking container for the induction range to which the heating magnetic body formed through a forming process of FIG. 3 has been coupled.

In the heating magnetic body 1 according to an embodiment of the present invention, as shown in FIGS. 1 and 2, the plurality of elastic support parts 3 is uniformly distributed in the base plate 2 formed of a thin plate of a magnetic material. Both ends of each elastic support part 3 are disposed to face each other and cut off so that the center is upward protruded. Accordingly, both ends of the elastic support part are upward bent and connected to the base plate 2 so that the centers on both sides are inclined and downward bent toward both ends. A cut-off hole 31 is formed in the base plate 2 in which the elastic support parts 3 are upward protruded. As shown in FIG. 3, if the cooking container A is formed in a mold B, when an upper mold B1 corresponding to a lower mold B2 in which the base plate 2 is seated is pressurized, the plurality of elastic support parts 3 comes into contact with the bottom of the upper mold B1 at the same time and elastically supports the upper mold B1. Accordingly, as shown in FIG. 4, after the cooking container A is formed, the plurality of elastic support parts 3 is configured to reach the top of the bottom of the cooking container A.

Furthermore, as shown in FIG. 3, when the cooking container A is fabricated, the aluminum alloy molten matter of the cooking container A made of a non-magnetic material is inserted into the plurality of through boles 4 perforated in the base plate 2 up and down and then hardened. Accordingly, the heating magnetic body 1 of a magnetic material and the cooking container A of a non-magnetic material having different materials and different elongations are coupled more strongly. Although the cooking container is used for an induction range for a long period of time, a bulging phenomenon generated because the bottom of the cooking container A is separated from the underlying heating magnetic body 1 is not generated.

Figure 5:
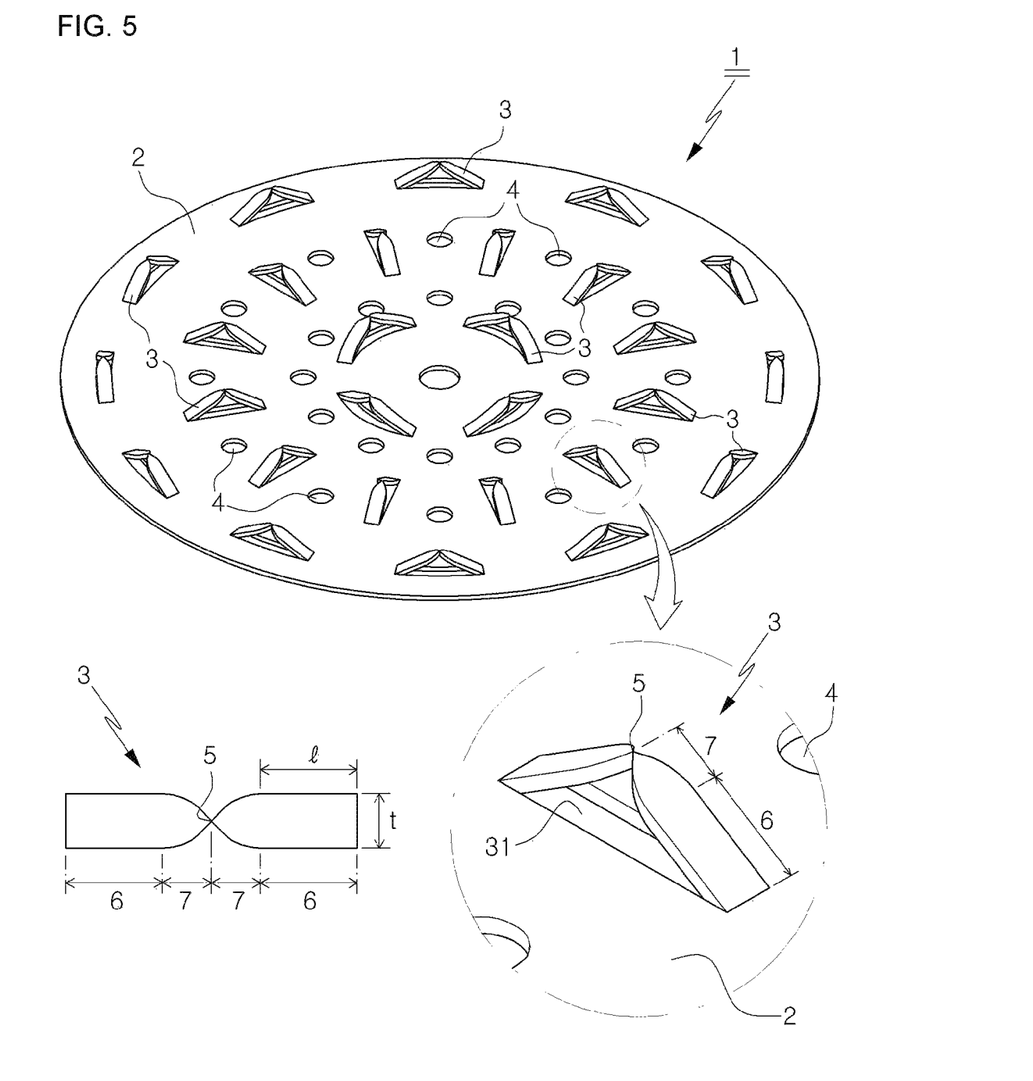
FIG. 5 is a stereographical diagram showing a second practical example of a heating magnetic body provided according to an embodiment of the present invention.

As shown in the enlarged view of FIGS. 1 and 3, each of the elastic support parts 3 includes a cutting edge contact part 5 having the center pointed in such a way as to come into point contact with the bottom of the upper mold B1. As shown in FIGS. 1 and 2, prop parts 6, each one having a specific width "t" in a specific interval "l", are formed at both ends of the elastic support part 3 connected to the base plate 2. A partial narrow part 7 whose width is gradually narrowed from the upper part of the prop part 6 to the cutting edge contact part 5 is formed at each of the elastic support parts 3. The partial narrow part 7 may be configured to have the width narrowed from the upper part of the prop part 6 to the cutting edge contact part 5 in a straight line as shown in FIGS. 1 and 2, or may be configured to have the width narrowed from the upper part of the prop part 6 to the cutting edge contact part 5 in a curved form as shown in a stereographical diagram of FIG. 5, that is, a second practical example.

Figure 6:
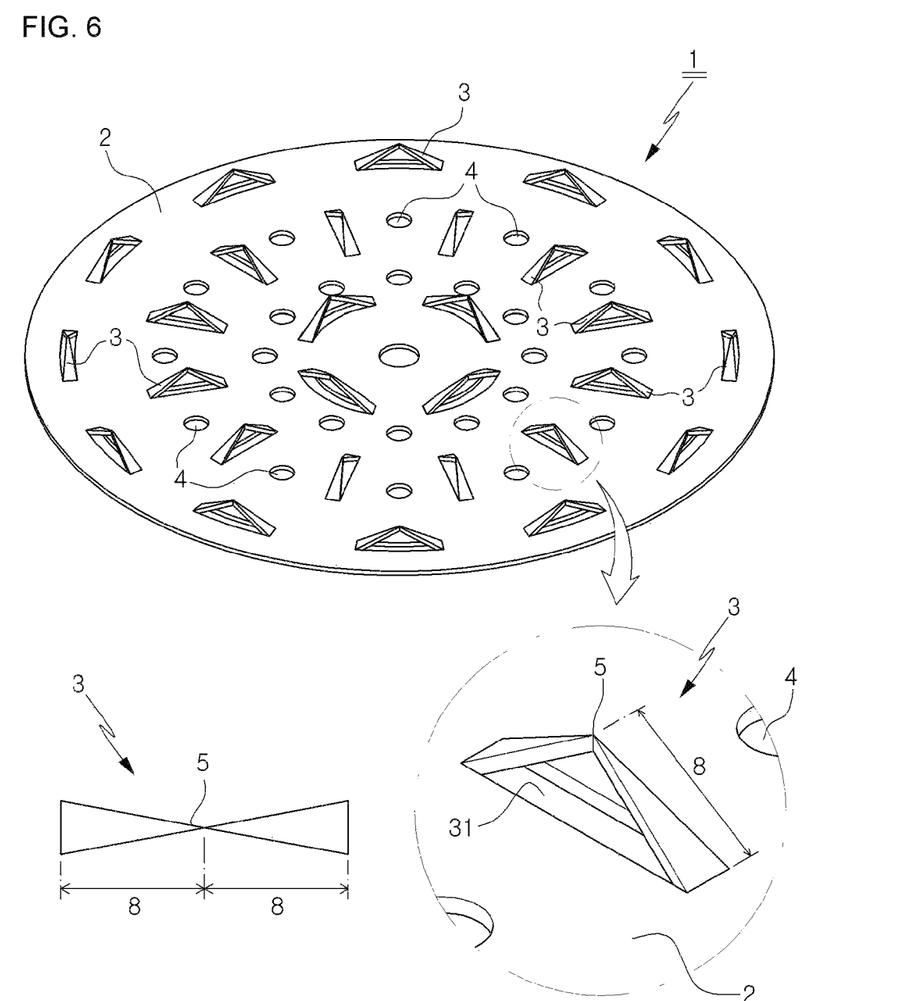
FIG. 6 is a stereographical diagram showing a third practical example of a heating magnetic body provided according to an embodiment of the present invention.

Furthermore, as shown in a stereographical diagram of FIG. 6 that is a third practical example, the elastic support part 3 may be configured to include only a full narrow part 8 having a full width narrowed from both ends of the elastic support part 3 connected to the base plate 2 without the prop part 6 to the cutting edge contact part 5. In this case, since the elastic support part 3 is weak in an elastically supporting force when the upper mold B1 is pressurized, it has a thick thickness in order to increase the support force compared to a case where the prop part 6 is present.

The heating magnetic body 1 for the cooking container A for an induction range according to an embodiment of the present invention is made of a magnetic body, coupled to the bottom of the cooking container A made of a non-magnetic material, and used when the cooking container A for an induction range is fabricated. As shown in FIG. 3, when the cooking container A is formed using the upper mold B1 and lower mold B2 of the mold B, the heating magnetic body 1 according to an embodiment of the present invention is elastically supported between the upper mold B1 and the lower mold B2. When the upper mold B1 and the lower mold B2 are pressurized so that they become close, the upper mold B1 is elastically supported by the plurality of elastic support parts 3 upward protruded from the base plate 2 seated in the lower mold B2.

As described above, in an embodiment of the present invention, as shown in FIG. 3, when the cooking container A is formed, the heating magnetic body 1 is elastically supported between the upper mold B1 and lower mold B2 of the mold B more strongly. Accordingly, there can be minimized a failure problem in that the aluminum alloy molten matter of the cooking container is bulged to the bottom of a conventional conductive plate 100 because a trapping member 200 is not supported between the upper mold B1 and lower mold B2 of the mold B for forming the container in the conductive plate 100 as shown in FIG. 7.

In this case, in an embodiment of the present invention, the cutting edge contact part 5 that is upward pointed is provided at the top of the center of the elastic support parts 3 upward protruded from the base plate 2 of the heating magnetic body 1. Accordingly, as shown in FIG. 4, after the cooking container A is formed, although the cutting edge contact part 5 of the elastic support parts 3 is configured to reach the top of the bottom of the cooking container A, it is not exposed to the top of the bottom of the cooking container A. In contrast, when the trapping member 200 upward protruded with a specific width from the conventional conductive plate 100 of FIG. 7 is configured to reach the top of the bottom of the container, as in FIG. 8, a portion corresponding to the width of the trapping member 200 is exposed over the bottom of the container and becomes defective or cannot be used for a container. Accordingly, the object and acting effects of the heating magnetic body 1 according to an embodiment of the present invention are quite different from the conductive plate 100 disclosed in Korean Patent Application Publication No. 10-0024630 in which the trapping member 200 has been upward protruded in order to firmly couple the container and the conductive plate 100.

As described above, when the cooking container A for an induction range is fabricated using the heating magnetic body 1 according to an embodiment of the present invention, the molten metal of the cooking container A is not bulged to the bottom of the heating magnetic body 1 and the heating magnetic body 1 is not exposed to the top of the bottom of the cooking container A. Accordingly, an error rate can be minimized. The coupling force of the cooking container A and the heating magnetic body 1 is increased. Accordingly, although the cooking container is used for an induction range for a long period of time, a bulging phenomenon is not generated, durability can be significantly improved, and lifespan can be further increased. The heating magnetic body 1 is coupled to the bottom of the cooking container A for an induction range in such a way as to be exposed and configured to reach the top of the bottom of the cooking container A. Accordingly, high frequency induction heating can be performed more smoothly and efficiency can be maximized because the heating magnetic body 1 directly receives an AC magnetic current from the coil of an induction range.

INDUSTRIAL APPLICABILITY

The cooking container for an induction range using the heating magnetic body for a cooking container for an induction range according to an embodiment of the present invention is an invention having high industrial applicability in the field of a cooking container for an induction range whose demand is recently increased suddenly because forming precision is significantly increased, an error rate is significantly reduced, and durability is improved.

As described above, although some embodiments of the present invention have been described in the detailed description of the present invention, the present invention may be modified in various ways without departing from the technical scope of the present invention. Accordingly, the scope of protection of the present invention is not determined by the embodiments, and should be construed as covering the claims and equivalent technical means thereof.

The invention claimed is:

1. A heating magnetic body for a cooking container for an induction range, comprising:
   a base plate (2) made of a magnetic material and having a bottom exposed to a bottom of a cooking container (A) made of a non-magnetic material; and
   a plurality of elastic support parts (3), each part having two ends face each other in the base plate (2) and cut off so that a center of each part is upwardly protruded and both ends are upwardly bent in such a way as to be connected to the base plate (2), wherein if the cooking container (A) is formed in a mold (B), when an upper mold (B1) corresponding to a lower mold (B2) in which the base plate (2) is seated is pressurized, the elastic support parts come into contact with a bottom of the upper mold (B1) simultaneously and are elastically supported to reach a top of the bottom of the upper mold (B1) after the cooking container (A) is formed,
   wherein each of the elastic support parts comprises a cutting edge contact part (5) having the center pointed in such a way as to come into contact with the bottom of the upper mold (B1), and wherein each of the elastic support parts (3) further comprises fully narrow parts (8) formed to have widths gradually narrowed from both ends connected to the base plate to the cutting edge contact part at the center.

2. A heating magnetic body for a cooking container for an induction range, comprising:
   a base plate (2) made of a magnetic material and having a bottom exposed to a bottom of a cooking container (A) made of a non-magnetic material; and
   a plurality of elastic support parts (3), each part having two ends face each other in the base plate (2) and cut off so that a center of each part is upwardly protruded and both ends are upwardly bent in such a way as to be connected to the base plate (2), wherein if the cooking container (A) is formed in a mold (B), when an upper mold (B1) corresponding to a lower mold (B2) in which the base plate (2) is seated is pressurized, the elastic support parts come into contact with a bottom of the upper mold (B1) simultaneously and are elastically supported to reach a top of the bottom of the upper mold (B1) after the cooking container (A) is formed,
   wherein the elastic support part comprises a cutting edge contact part (5) having the center pointed in such a way as to come into contact with the bottom of the upper mold (B1),
   wherein each of the elastic support parts (3) comprises:
   prop parts (6), each part being formed to have a specific width in a specific interval, at both ends connected to the base plate; and
   partially narrow parts (7), each part being formed to have a width gradually narrowed from an upper part of the prop part (6) on each side to the cutting edge contact part (5) at the center.

* * * * *